April 10, 1956　　　R. KUNIN　　　2,741,590
ELECTROLYTIC RECOVERY OF MANGANESE
Filed Feb. 19, 1953
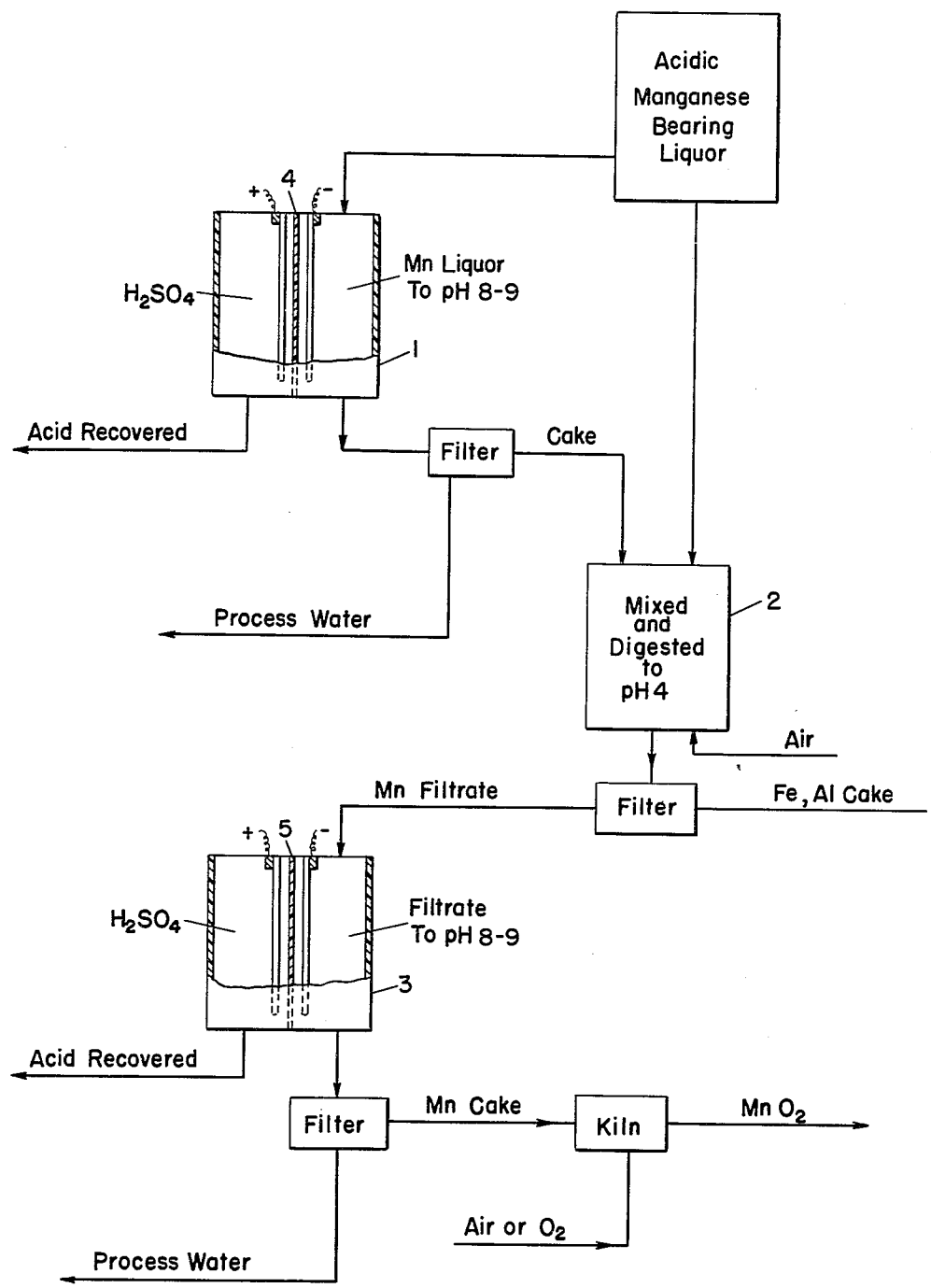

United States Patent Office 2,741,590
Patented Apr. 10, 1956

2,741,590

ELECTROLYTIC RECOVERY OF MANGANESE

Robert Kunin, Trenton, N. J., assignor to the United States of America as represented by the United States Atomic Energy Commission Application February 19, 1953, Serial No. 337,748

4 Claims. (Cl. 204—96)

This invention relates to the recovery of manganese from acidic solutions containing also such metals as iron and aluminum. More particularly the invention relates to the recovery of manganese from sulfuric acid leach liquors and from the barren liquor left after the recovery of uranium from leach liquors.

In the sulfuric acid leaching of uranium-bearing ores the uranium is extracted as a complex acid in which the uranium has a valence of plus six. In order to convert any uranium in the ore that has a lower valence to the plus six state, present practice is to add an oxidizing agent, such as manganese dioxide, to the ore pulp during or prior to leaching. In separating the uranium from the leach liquor one practice is to reduce the uranium to the plus four state and adjust the pH to cause the uranium to precipitate as a uranous phosphate. A process of accomplishing such a precipitation in an electrolytic cell is described in copending application Serial No. 337,747, filed February 19, 1953. Another method for recovering the uranium from the acid leach liquor is to pass the liquor through a bed of strongly basic anion exchange resin. In both cases the barren liquor after the separation of the uranium contains the manganese used in the earlier oxidation reaction. It is desirable to recover this manganese preferably as manganese dioxide for reuse in oxidizing the uranium in the ore. It is also desirable to recover the acid used in leaching the ore.

In the recovery of manganese from manganese-bearing ores one practice is to leach the roasted ore with acid in the presence of a reducing agent such as metallic iron whereby the manganese is dissolved as the manganous salt. In the steel industry iron pickle liquors have presented a recovery and disposal problem and one method of utilizing them has been as leach acid for manganese ore. In the recovery of manganese from such leach liquors the practice has been to pass the leach liquor through limestone to neutralize the acid and precipitate the iron and, after filtering, to precipitate the manganese with slaked lime. Disadvantages to this recovery process are that the acid values in the liquor are destroyed and the manganese is contaminated with calcium.

The object of this invention is to provide a means of recovering in a high state of purity the manganese from such liquors. Another object is to provide a means of recovering for reuse the acid constituents of such liquors.

These and other objects are accomplished by a process which is illustrated in the attached drawing which represents a flow sheet of the process. In the drawing 1 represents an electrolysis cell in which the cathode section is separated by an anion exchange membrane 4. The term "anion exchange membrane" is used to designate a membrane which is readily permeable to anions but resists the transport of cations. As described in copending application Serial No. 205,413, filed January 10, 1951, now Patent No. 2,681,319, dated June 15, 1954, membranes having this quality may be prepared by milling particles of anion-exchange resin in a matrix of certain polymeric materials such as polyethylene. A similar electrolysis cell is represented at 3, this cell having an anion exchange membrane 5.

In the practice of the process manganese-bearing liquor which is contaminated with iron or aluminum or both, such as the barren leach liquor after the removal of uranium by the processes heretofore referred to, is passed to the cathode section of the electrolysis cell 1 in which it is subjected to an electrolysis during which the anions pass through the anion exchange membrane 4 whereby the pH in the cathode section is raised and the pH in the anode section lowered. As the pH in the cathode section rises, the iron and aluminum and then the manganese precipitate. The electrolysis is continued until a pH of at least 8 is reached. A still higher pH may be taken as the end-point if desired. At pH 9.0 all manganese in the liquor will have been precipitated. The slurry of precipitate and mother liquor is then filtered and the filter cake transferred to a digestion chamber 2 in which it is mixed and digested with sufficient of the original manganese-bearing liquor to make the pH of the mixture about 4.0. During this step the precipitated manganese from the first electrolysis cell passes back into solution and the iron and aluminum in the acidic liquor that by-passes the electrolysis cell is precipitated. The slurry from the digestion chamber 2 then passes to a filter in which the solids are removed. The manganese-bearing filtrate then passes to the cathode section of the second electrolysis chamber 3 in which it is again subjected to electrolysis until the pH reaches at least 8 and if desired 9 or more. In this cell the manganese is again precipitated as hydroxide. The slurry of precipitated manganous hydroxide and mother liquor is transferred to a filter in which the manganous hydroxide is separated from the mother liquor which may be discarded or, if desired, reused as process water. The manganous hydroxide may then be transferred to a kiln in which it is dehydrated. It may also be oxidized in known manner to manganese dioxide, and for this oxidation the oxygen formed at the anodes during the electrolysis may be used to advantage. During each of the electrolysis steps acid is formed in the anode sections of the cells. This acid may be reused in the leaching step.

It has been found that, during the digestion of the slurry from cell 1 with the acidic manganese-bearing liquor which by-passes this cell, it is desirable to pass air through the mixture. The digestion chamber 2 may, therefore, be provided with means for blowing air through the mixture. This assists in the precipitation of the iron in the mixture.

The following examples illustrate the invention.

*Example 1*

An electrolysis cell having 0.58 sq. ft. of membrane surface per gallon of capacity in each electrode compartment and having high density graphite electrodes was charged with manganese-bearing liquid in the cathode compartment and sulfuric acid in the anode compartment. The manganese-bearing liquid had a pH of 2.3 and contained 4.0 grams of manganese per liter along with an undetermined amount of iron, aluminum, calcium and magnesium. The sulfuric acid in the anode section was 1 normal. The electrodes were placed close to the membrane surfaces and the solutions were mechanically agitated throughout the electrolysis. The electrolysis was conducted at a voltage of 11.3 and was continued until the pH in the cathode section exceeded 8 and approached 9. The time of treatment was approximately one hour per gallon of manganese-bearing liquid treated.

When the desired pH in the cathode section was reached, the cell was emptied. The anode liquid was approximately 1.7 normal sulfuric acid. The contents of the cathode section were filtered and analyzed. Analysis showed a 100% precipitation of manganese. The power consumption was 9.1 kw.-h. per pound of manganese and the sulfuric acid recovery was approximately 3.4 pounds per pound of manganese.

The filter cake was then digested with sufficient of the original manganese-bearing liquid to give a mixture having a pH that remained constant at 4 for one hour. This required an amount of original liquor a little in excess of the amount treated in the electrolysis cell. During the digestion the mixture was agitated by blowing air through it. The digested mixture was then filtered and the manganese-enriched filtrate which contained over 90% of the manganese from the original liquor was again electrolyzed in a cell as described above to a pH of 8.9. In this electrolysis a voltage of 12.2 was used, and the time was about 1½ hours per gallon of filtrate. Again 100% of the manganese was precipitated. It was filtered and dried.

By this process manganese of a very high degree of purity may be obtained. From 90% to 95% of the manganese in the original liquor can be easily recovered over 85% pure.

*Example 2*

In a manner similar to the procedure described in Example 1 an acidic manganese-bearing liquor containing 5.3 grams of manganese, an undetermined amount of iron and aluminum and other metals not identified and which had a pH of 1.2 was electrolyzed until the pH approached 9. The precipitate from the first cell was filtered and digested with an amount of original acidic liquor to give a pH of 4. In this case the additional liquor needed amounted to about one-half the amount which had been electrolyzed. Air-agitation was used during digestion. The mixture was again filtered and the manganese-bearing filtrate again electrolyzed as in Example 1.

The precipitated manganous hydroxide was filtered and dried under oxidizing conditions.

It is desirable in the practice of the invention to have the pH fairly close to pH 4 after the digestion of precipitate from the first cell with the acidic liquor that bypasses this cell. However, considerable leeway is permissible on both sides, with risk of incomplete precipitation of iron and aluminum if the pH is too low and with risk of precipitation (or incomplete solution) of manganese if the pH is too high. It would be inadvisable to operate outside the range pH 3.5–4.5 and advisable to stay within the range pH 3.7–4.4.

I claim:

1. The process of recovering manganese from a sulfuric acid solution which also contains a metal of the group consisting of iron and aluminum which comprises electrolyzing said solution, as the catholyte, in the cathode section of an electrolysis cell having the cathode section separated by an anion-exchange membrane from an anode section in which the anolyte is sulfuric acid until the manganese in said solution is precipitated, mixing and digesting the precipitate with an amount of the original acidic solution sufficient to give to the mixture a pH between 3.5 and 4.5, filtering said digested mixture and electrolyzing the filtrate, as the catholyte, in the cathode section of an electrolysis cell having the cathode section separated by an anion-exchange membrane from an anode section in which the anolyte is sulfuric acid until the manganese is again precipitated.

2. The process of claim 1 in which the mixture of precipitate from the first electrolysis cell and original acidic solution has air passed through it during the digestion step.

3. The process of recovering manganese from a sulfuric acid solution which also contains a metal of the group consisting of iron and aluminum which comprises raising the pH of said solution to a value above pH 8 by electrolyzing it, as the catholyte, in the cathode section of an electrolysis cell having an anion-exchange membrane separating the cathode section from the anode section in which the anolyte is sulfuric acid, filtering said solution, and digesting the filter cake with more of the original manganese-bearing solution in a ratio to give a pH between 3.5 and 4.5 to the digested mixture, again filtering and electrolyzing the filtrate, as catholyte, to a pH between 8 and 9 in the cathode section of an electrolysis cell having an anion-exchange membrane separating the cathode section from the anode section in which the anolyte is sulfuric acid, and separating the manganous hydroxide precipitated in said cell.

4. The process of claim 3 in which air is passed through the mixture of filter cake from the first electrolysis cell and original manganese-bearing solution during the digestion step.

References Cited in the file of this patent

UNITED STATES PATENTS

| | | |
|---|---|---|
| 2,356,515 | Guareschi | Aug. 22, 1944 |
| 2,636,851 | Juda et al. | Apr. 28, 1953 |